(12) United States Patent
Brigham et al.

(10) Patent No.: US 11,645,195 B1
(45) Date of Patent: May 9, 2023

(54) AUTO-DECISIONING TEST INTERFACE AND TEST DATABASE FOR BYPASSING FUNCTIONALITIES OF DECISION ENGINES AND SIMULATING RETURN VALUES

(71) Applicant: Wells Fargo Bank, N.A., San Francisco, CA (US)

(72) Inventors: Stacy Brigham, San Francisco, CA (US); Brooke Heethuis, San Francisco, CA (US); Linda King, San Francisco, CA (US); Matt Rowe, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 328 days.

(21) Appl. No.: 17/119,697

(22) Filed: Dec. 11, 2020

Related U.S. Application Data

(60) Provisional application No. 62/978,209, filed on Feb. 18, 2020.

(51) Int. Cl.
*G06F 11/36* (2006.01)
*G06F 11/32* (2006.01)
*G06F 11/34* (2006.01)

(52) U.S. Cl.
CPC ........ *G06F 11/3684* (2013.01); *G06F 11/323* (2013.01); *G06F 11/3457* (2013.01); *G06F 11/3688* (2013.01); *G06F 11/3692* (2013.01)

(58) Field of Classification Search
CPC ............... G06F 11/323; G06F 11/3457; G06F 11/3684; G06F 11/3688; G06F 11/3692
See application file for complete search history.

(56) References Cited

U.S. PATENT DOCUMENTS

| | | | |
|---|---|---|---|
| 9,830,173 B1* | 11/2017 | Kothandaraman | H04L 43/00 |
| 2009/0271351 A1* | 10/2009 | Kandasamy | G06Q 10/0637 706/47 |
| 2012/0016831 A1* | 1/2012 | Proctor | G06F 11/3664 706/47 |
| 2014/0317600 A1* | 10/2014 | Klunder | G06F 11/3672 717/124 |
| 2015/0212920 A1* | 7/2015 | Kraus | G06F 11/3006 717/127 |
| 2016/0217169 A1* | 7/2016 | Elias | G06F 21/6227 |
| 2021/0158129 A1* | 5/2021 | Srivastava | G06N 3/0472 |

OTHER PUBLICATIONS

Ghanem Soltana et al., "Synthetic data generation for statistical testing," 2017 [retrieved on Dec. 14, 2022], 32nd IEEE/ACM International Conference on Automated Software Engineering (ASE), pp. 872-882, downloaded from <url>:https://ieeexplore.ieee.org/. (Year: 2017).*

* cited by examiner

*Primary Examiner* — S. Sough
*Assistant Examiner* — Stephen D Berman
(74) *Attorney, Agent, or Firm* — Foley & Lardner LLP

(57) ABSTRACT

A testing platform for an auto-decision engine is disclosed. An auto-test database for a decision engine may be accessed and modified by, for example, executing an application programming interface protocol of a third-party computing system. The decision engine may be bypassed, and a simulated auto-decision may be requested based on a unique key corresponding to a scenario in the auto-test database. A graphical user interface displays information regarding the auto-test database on a user computing device, and one or more output data fields in the auto-test database may be modified.

20 Claims, 5 Drawing Sheets

AUTO-DECISIONING TEST INTERFACE AND TEST DATABASE FOR BYPASSING FUNCTIONALITIES OF DECISION ENGINES AND SIMULATING RETURN VALUES

CROSS-REFERENCE TO RELATED APPLICATIONS

This application claims priority to U.S. Provisional Patent Application No. 62/978,209 filed Feb. 18, 2020, and entitled "Auto Decision Test Data Interface," the entirety of which is incorporated herein by reference.

TECHNICAL FIELD

The present disclosure relates to test databases and bypassing of automated decision engines (or certain functions of decision engines) to simulate responses from the decision engines for testing or other administrative functions.

BACKGROUND

A decision engine may be used for making particular multi-factor decisions that may be based on a complex interaction of large datasets representing information from multiple different sources. For example, a decision engine may receive and/or acquire many inputs and, through application of suitable machine learning models, return a certain decision. An enterprise computing system may utilize a decision engine for complex decision making processes, but the decision engine may be one sub-process in a larger process that includes other upstream and/or downstream sub-processes. Due to the complexity of the multi-factored decisioning process that may be employed by the decision engine, evaluating how the larger process functions in different circumstances (e.g., based on different decisions from the decision engine) may be difficult (e.g., because of relative uncertainty or unpredictability of what particular inputs would obtain a desired decision from the decision engine, or because of the impracticality of providing all inputs that would be needed to receive a decision being sought).

SUMMARY

Various potential embodiments of the disclosed invention may relate to a method implemented by an enterprise computing system that uses an auto-decision engine of a third-party computing system, the method comprising: requesting, by the enterprise computing system, from the third-party computing system comprising the auto-decision engine and an auto-test database, a simulated auto-decision based on a unique key corresponding to a scenario, the request for the simulated auto-decision bypassing one or more functions the auto-decision engine, the auto-test database comprising a plurality of scenarios, each scenario corresponding to a respective unique key and one or more corresponding output data fields; receiving, by the enterprise computing system, the simulated auto-decision corresponding to the unique key, the simulated auto-decision comprising the one or more output data fields corresponding to the scenario; accessing, by the enterprise computing system, the auto-test database by executing an application programming interface (API) protocol of the third-party computing system; providing, by the enterprise computing system, a graphical user interface (GUI) displaying information regarding the auto-test database on a user computing device; receiving, by the enterprise computing system via the GUI, a user input that indicates a modification to the one or more output data fields in the database; and in response to receiving the user input, using the API protocol to update the one or more output data fields in the auto-test database.

Various potential embodiments of the disclosed invention may relate to a computer-readable medium comprising instructions that, when executed by a processor, cause the processor of an enterprise computing system to perform the operations of: executing an API protocol to access an auto-test database of a third-party computing system comprising an auto-decision engine, the auto-test database corresponding to the auto-decision engine and comprising one or more scenarios, each scenario corresponding to one or more input data fields and one or more output data fields; providing a graphical user interface (GUI) on a display of a user computing device, the GUI configured to display information regarding the auto-test database; receiving a user input that indicates a modification to the one or more data fields of the database; in response to receiving the user input, causing one or more data fields in the auto-decision database to update using the API; transmitting to the third-party computing system a request to bypass the auto-decision engine and return a simulated auto-decision based on the auto-test database, the request comprising a unique key corresponding to a scenario in the auto-test database; and receiving the simulated auto-decision corresponding to the unique key, the simulated auto-decision comprising output data fields corresponding to the scenario and updated in response to the user input.

Various potential embodiments of the disclosed invention may relate to a computing system comprising: a decision engine configured to receive data input fields and perform a set of functions to return decisions based on the data input fields; an auto-test database (i) updatable via by third-party computing system via execution of an API protocol, and (ii) comprising a plurality of unique keys, each unique key corresponding to one or more output data fields; and a processor and a memory comprising instructions that, when executed by the processor, cause the processor to: receive, from the third-party computing system, a request to bypass one or more functions of the decision engine and return a simulated auto-decision, the request comprising a unique key; in response to receiving the request, accessing the auto-test database to identify a set of output data fields corresponding to the unique key; in response to identifying the set of output data fields corresponding to the unique key, generating the simulated response without performing one or more functions in the set of functions otherwise performed by the decision engine in returning decisions, the simulated response comprising the set of output data fields; and transmitting the simulated response to the third-party computing system.

BRIEF DESCRIPTION OF THE DRAWINGS

The foregoing and additional features of the present disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
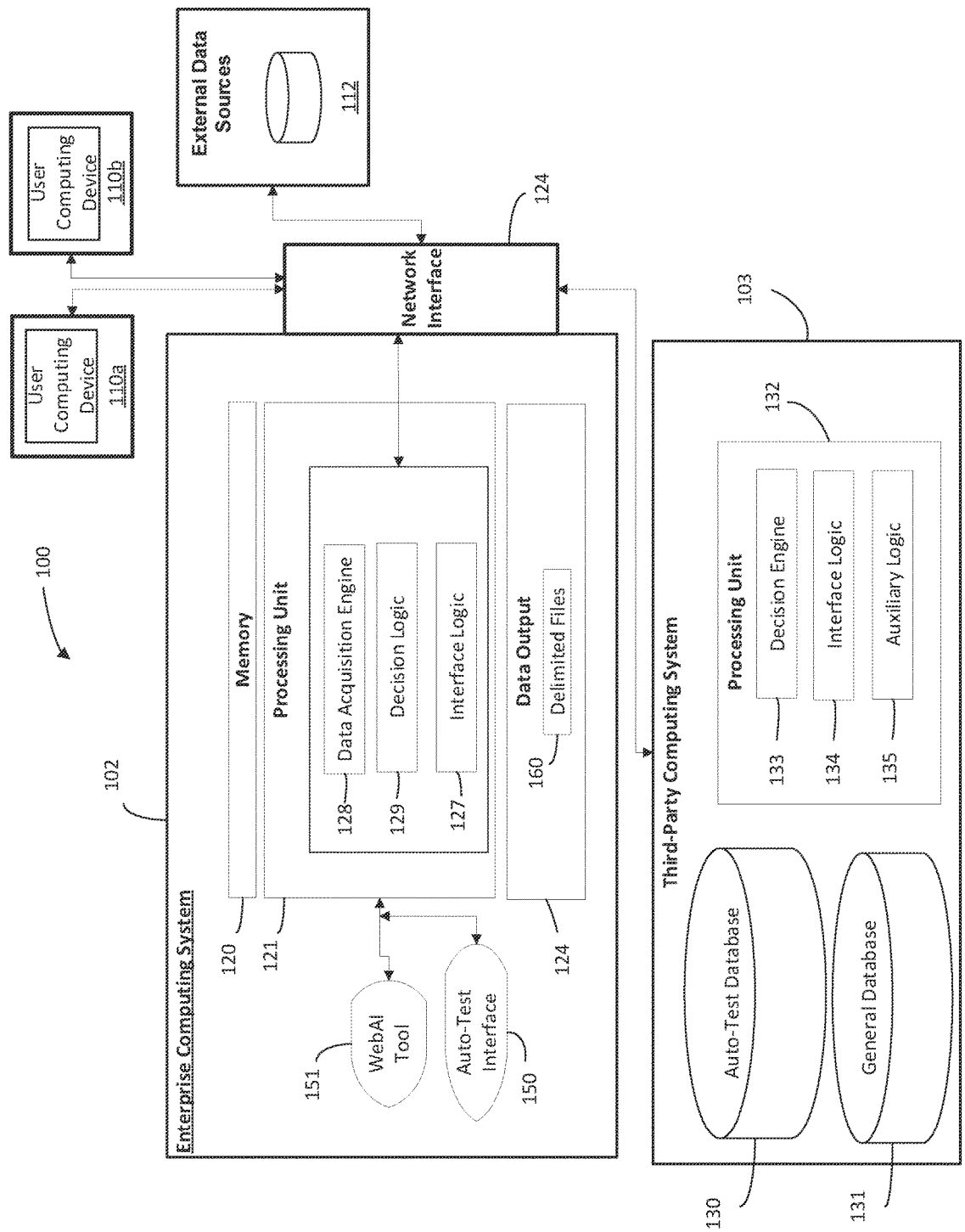
FIG. 1 is a block diagram representation of various computing systems and devices involved in implementing the disclosed approach, in accordance with various potential embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

In various embodiments, an enterprise computing system may employ a decision engine that is part of, or otherwise administered or managed by, a third-party computing system. The enterprise computing system may thus incorporate the decision engine into an overall process that includes accepting a result from the third-party decision engine and performing certain internal downstream processes that use outputs from the decision engine. Testing and evaluating whether an internal downstream process functions as intended in response to different decisions from the decision engine poses a challenge, as the decision engine is primarily under the control of the third-party computing system and it may be difficult to reliably predict what decisions are returned in every situation. Accordingly, in various embodiments, the enterprise computing system may wish to bypass a decision engine and obtain a particular result from the decision engine to simulate a particular scenario in order to test how the downstream processes function in that particular situation. For testing purposes, the enterprise computing system may send to the third-party computing system a test request that is configured to partially or wholly bypass the functions of the decision engine and instead return a specified result. The third-party computing system may be provided with a test database that defines the scenarios that may be simulated upon request. Because the scenarios and unique keys corresponding to the scenarios may change over time, a test interface that is accessible to the enterprise computing system allows for administrative changes to the test database (and thus how or when the decision engine may be bypassed and various results simulated).

Various embodiments described herein relate to systems, methods, and devices for a test platform that facilitates the integration or implementation of one or more decision engines into a computing environment. The computing environment may include an enterprise computing system (e.g., a computing system owned or controlled by an enterprise) that is configured to perform various processes to implement or assist with implementing the day-to-day operations of the enterprise. In one example, the enterprise computing system may receive an application or request for a product or service, perform one or more processes to determine the eligibility of the user (e.g., make a decision on the application), then perform one or more processes based on the determined eligibility of the user (e.g., downstream processes). In some embodiments, a decision engine that is well-suited to complex decision-making processes may be implemented to determine the eligibility of the user. The decision engine may receive, for example, many inputs from various sources (e.g., inputs in the application, and information from the enterprise computing system or other third-party computing systems), apply various models and algorithms to the inputs, and output a decision that is indicative of, for example, whether the application is approvable. The downstream processes are then performed based on the decision to verify the eligibility and/or provide a response to the user and/or the enterprise computing system. However, in order to effectively incorporate the decision engine, the necessary logic for the downstream processes may need to be tested based on various potential outputs of the decision engine. When the decision engine is offloaded or outsourced to a third-party computing system (rather than remaining internal to the enterprise computing system), reliably integrating the third-party decision engine may require potential results from the decision engine that may be received by the enterprise computing system to be tested. This may be accomplished, for example, by the implementation of a test platform that is able to simulate various outputs from the decision engine in a predictable manner, which allows for the debugging and implementation of the downstream processes at the enterprise computing system. The various components and configurations of the testing platform are discussed in further detail below.

In various embodiments, the enterprise computing system is a financial institution computing system of a financial institution. The decision engine may be used, for example, to determine whether an application for a new account is approved or declined. As indicated above, the financial institution computing system or other service provider may use a third-party decisioning platform (e.g., of a third-party computing system) that implements the decision engine, which may be used to automate processing of credit card applications or other processes. For example, an applicant may, through an application or website provided by a financial institution computing system, apply for a credit card, and the financial institution computing system may provide certain inputs to the third-party platform and in return accept a result of the decision process. The decision whether to approve each application may include a decision (e.g., approve or decline) as well as other information, such as reasons for the decision (e.g., insufficient information, low score, etc.). Once the result is received by the financial institution computing system, the financial institution computing system takes additional (e.g., downstream) steps in serving the applicants or other customers. The financial institution often wishes to test the additional steps, such as how a result that is received from the decision engine is subsequently processed.

Various embodiments of the disclosed test platform allow users at the financial institution to, for example, provide a certain set of inputs and/or instructions to the third-party decisioning platform that cause the third party decisioning platform to return certain results (decisions, attributes, or other data). For example, an administrative user of the financial institution computing system may test how a certain result from the third party computing system is handled by the enterprise computing system. To accomplish this, the administrative user may simulate a decision by instructing the third-party decisioning platform to return a certain, known result (which may be identified by a code, and which may be the same as or different from a result that would have been returned by the normal decisioning process had it not been bypassed), which is then accepted and processed by the enterprise computing system. In various embodiments, in order to simulate the decision, a test database is used, with a unique record for each set of circumstances that may be tested (e.g., an applicant with certain attributes or application data). In an example, the financial institution computing system indicates to the third-party platform which record is being simulated by providing a code that identifies the circumstance or result to be returned. From the perspective of the third-party computing system, the decision engine may be provided to multiple financial institution computing systems (of, e.g., a number of banks issuing their own credit cards), and accordingly, the third-party computing system may provide multiple financial institution computing systems that subscribe to its decisioning services with a platform to test their own processes.

In various embodiments, the testing platform includes a database of records that include the particular outcomes to be returned. As an example, a decline outcome may correspond with an applicant with certain attributes (e.g., FICO score of 550 and "too many inquiries" on his credit history). A result triggers sending of certain letters or other communications or actions by the financial institution computing system, which may wish to test the triggered actions. Database records within the database, which may correspond with all outcomes to be tested, may be added, deleted, or modified. For example, the financial institution computing system may transmit the database records to the third-party computing system administering the decision engine. A user interface linked to the database (via, e.g., an application programming interface (API) protocol) allows administrative users to condition the data used by the testing platform. For example, a user of the financial institution computing system may wish to update a record—corresponding to a simulated applicant (with designated personal information, such as a particular name, address, and social security number) that is to be "declined" for having a first set of attributes (e.g., a FICO score of 550 and too many inquiries)—such that the record is instead "declined" for having a second set of attributes (e.g., FICO score of 575 and too many inquiries). That is, the interface allows for granular changes to individual records, as well as changes to records in batch. Such a user interface thus allows for manipulation of an auto decision database to return preconditioned records or outcomes back as part of the decision request.

The decision engine uses the various inputs in structured and logical manner (e.g., via following a decision tree or other decision logic) and outputs a decision based on particular criteria unique to the decision engine. The decision engine may be configured to receive various inputs regarding a customer applying for a product or service offered by an enterprise subscribing to the decision engine of the third-party computing system, and output a corresponding result or decision. However, such decision engines may use significant processing power due to the intensity of the processes performed to make the resulting decision, and if the desired result is known in advance, the computing resources otherwise used by the decision engine to reach the desired result may be saved. Moreover, a decision engine deployed on the enterprise computing As indicated above, the test platform includes a test data database that enables simulation of decisions in order to test downstream processes and thereby to reliably implement and integrate the decision engine into internal processes. That is, the test data database is be used to simulate an output (e.g., decision) based on various inputs without operating or running the decision engine for a simulated customer. The test data database may include information regarding multiple scenarios (e.g., multiple potential input values) with corresponding outputs from the decision engine. In an example, the test data database includes conditioned data and is implemented or stored by the third party computing system along with the decision engine. The enterprise computing system, for example when testing downstream processes, transmits a test request that indicates to the third party computing system that the decision engine should be bypassed since the decision or output from the third party computing system will be used for the testing of downstream processes by the enterprise computing system. In this way, the enterprise computing system offloads processing requirements demanded by the decision engine and also alleviates or reduces the processing strain to the third party computing system during the simulation or testing of the systems.

As an example implementation, the decision engine is used when a customer is actually applying for a product or service offered by via the enterprise computing system. The enterprise computing system transmits a request with information regarding the customer and application, the third party computing system runs the decision engine with the information, and returns to the enterprise a decision or outcome of the decision engine. The enterprise computing system then runs downstream decision or outcome processes. The downstream processes may include additional tests (e.g., to see if the customer is disqualified for other reasons not related to the parameters of the decision engine), generation of a response that may be displayed to an agent or the customer via a device (e.g., a response that indicates the outcome of the decision or prompts for additional information), or facilitation of providing the customer with the product or service (e.g., if the decision is a "yes"). However, to ensure that the enterprise computing system performs the downstream processes in a reliable and efficient manner, the enterprise computing system may wish to simulate the process. Accordingly, the test database is implemented and stored by the third party computing system to facilitate such simulations. In this example, the enterprise computing system generates and transmits a test request for a particular product (e.g., a credit card application) according to a particular scenario of a simulated customer (e.g., a customer with a FICO score less than 600 and 10 inquiries in the past 12 months) to the third-party computing system. The third-party computing system determines, based on an indication in the test request that distinguishes the test request from a real request, that the enterprise computing system is requesting a simulated result or decision. The third party computing system then bypasses the decision engine based on the indication, references the test database, and returns the simulated decision to the enterprise computing system. The simulated decision may include a decision in a similar format to a real decision. For example, the decision may include, for example, a binary decision (e.g., "yes" or "no") along with a particular explanation for the decision (e.g., "Unfortunately, you do not qualify because your credit score is below our minimum of 600").

However, the test data database may need to be periodically updated with new information or new scenarios based on, for example, an evolution or update in the enterprise computing system or third party computing system (e.g., an update in decision format, update in simulated results based on new regulations, etc.). Accordingly, a test data database interface is implemented that allows the enterprise computing system to dynamically and particularly adjust particular scenarios or subsets of scenarios within the test database (e.g., stored by the third-party computing system). For example, an administrative user of the enterprise computing system may wish change an output corresponding to any customer with a credit score of 550 or below and/or credit inquiries of 9 or more in the past 12 months to automatically return a simulated result that indicates that the customer is disqualified (e.g., change the binary decision from a "yes" to "no" and update the explanation). To make this change, the test data database interface is used or accessed by an employee (e.g., having the correct authentication credentials and permissions) to port into the test data database (e.g., via an API session with the third party) in order to change the simulated output. In this way, the processing requirements of the computing system may be reduced while improving the ability for the enterprise computing system to manage, update, and access the test data database for downstream testing.

As indicated above, the test database structure includes data records for each scenario or decision that the decision engine may reach. In various embodiments, a record (e.g., scenario) is identified by the user at the financial institution by a specific test key. The presence of a test key value in a test key field is used to indicate to the third-party computing system whether the request is a real request or a test request. For example, a request from the enterprise computing system that does not include a value in a test key field of the request indicates to the third party computing system that the request is a real request. Further, a request that includes a value in the test key field of the request may indicate to the third party computing system that the request is a test request and the particular value indicates a particular decision that should be returned to the enterprise computing system. In some embodiments, the request also includes the information regarding the applicant. For example, if the applicant information is sent in without the key (e.g., name, address, and social security number but no key), the third-party platform may go through its normal process of making a credit decision (which may or may not be the same outcome in a database record). But providing a particular test key bypasses the decision engine and returns a particular outcome as indicated in the record corresponding to the value in the test key field. For example, a specific test key may be linked to specific record or scenario and the third party computing system may cross-reference, within the test database, the specific test key and return the conditioned decision to the enterprise computing system. In this way, the enterprise computing system is able to selectively receive conditioned decisions in order to simulate particular outcomes of the decision engine, which allows for the enterprise computing system to test their end-to-end operations. Accordingly, such a database/interface allows the third-party computing system with the decision engine to provide its institutional clients with test platforms, and allows institutional clients to test various processes in a controlled manner that can bypass the logic implemented by the normal decision process.

FIG. 1 is a block diagram of an example computer-implemented system 100, with an enterprise computing system in communication with various systems and devices in accordance with various potential embodiments. The system 100 includes an enterprise computing system 102, one or more user computing devices 110a-b, external data sources 112, and a third-party computing system 103 configured to communicate via a network.

The multiple user computing devices 110a-b may include one or more personal computing devices, desktop computers, mobile devices, or other computing devices that may be utilized or accessed by clients, agents, or other users. In general, the enterprise computing system 102 is enabled to receive inputs from clients, agents, or other users via the user computing devices 110a-b, monitor the inputs or variables within the system 100 over time. In some embodiments, each of the user computing devices 110a-b may include a processor, memory, communications hardware for transmitting and receiving data, and a display for presenting a graphical user interface (GUI). The enterprise computing system 102 is configured to output the GUI onto the display of any of the user computing devices 110a-b. For example, the enterprise computing system 102 may be configured to provide instructions (e.g., HTML instructions) to one or more of the user computing devices 110a-e (and/or computing systems 140a-c) that cause or allow the respective user computing device 110a-f to display the GUI (e.g., or information of the GUI) generated by the enterprise computing system 102.

The network may be or include any type of type of network. For example, the network may be a wireless network interface (e.g., Internet, WI-FI, etc.), a wired network interface (e.g., Ethernet), or any combination thereof. The network is structured to permit the exchange of data, values, instructions, messages, and the like between and among various components of FIG. 1.

The enterprise computing system 102 includes a memory device 120, a processing unit 121, and a network interface 124. The network interface 124 is structured to enable the enterprise computing system 102 to connect to and to exchange information over the network with, for example, user computing devices 110a-b, the third party computing system 103, or other external data sources 112 or computing devices. The network interface 124 is coupled to the processing unit 121 in order to enable the processing unit 121 to receive and transmit messages, data, and information via the network.

The processing unit 121 includes one or more processors and non-transitory machine readable medium that when executed by the processor, causes the processor to perform or assist in performing any of the methods, operations, or steps described herein. The processing unit 121 includes a data acquisition engine 128 and decision logic 129. The data acquisition engine 128 is structured to receive information (e.g., from the multiple user computing devices 110a-f, the third party computing system 103, and/or the external data sources 107) and store the information within the memory device 123. In some embodiments, data acquisition engine 128 may store the information within the memory device 123 in an ordered structure where each request for a decision from a user computing device 110a stores the request in an instance with associated data fields (e.g., with values received as part of the request or retrieved by the data acquisition engine 128 from other sources). The data fields may include information associated with a request for a product or service. For example, a request may be from a client wishing to open a new credit account, the data fields may include information regarding the customer such as name, address, birth date, information from the external data sources such as a credit report (e.g., credit score, number of inquiries in past 12 months, current revolving credit usage, etc.), information from a local client database (e.g., local to the enterprise computing system 102) that has stored information regarding the client from current or past accounts or interactions between the enterprise and client, and/or a unique key or identification number for the scenario.

The decision logic 129 is configured to generate requests based on, for example, an application received from a client. For example, the decision logic 129 may generate a request to the third party computing system 103 indicating that the request should be processed by a decision engine in order to determine client eligibility for a product or service offered via the enterprise computing system. In another example, the decision logic 129 generates a test request to the third party computing system 103 indicating that a test output from the auto-test database should be returned. In some embodiments, the request is indicated by a lack of a value in a test key variable of the request and the test request is indicated by a populated value in the test key variable of the request. The decision logic 129 is also configured to perform one or more downstream operations once an output is returned from the third party computing system 103 is received. For example, the decision logic 129 may generate a response, perform additional tests to vet the client and determine client eligibility, and/or perform operations to provide the client with the product or service.

As indicated above, the decision logic 129 may be tested during implementation or updated by generating a test request (e.g., via populating the test key variable with a unique key). The test request is designed to return a particular output from the third party computing system 103 such that an actual request is simulated. The decision logic 129 of the enterprise computing system 102 then performs the downstream processes or operations with the particular simulated output. The output of the decision logic 129 may then be analyzed (automatically by the enterprise computing system 102 or by a user of the enterprise computing system) to ensure that the decision logic 129 is performing the downstream processes and outputting a response that is acceptable and within regulation. In an example, the decision logic 129 is communicably coupled to the data acquisition engine 128 or memory 120 in order to generate the request or test request to the third-party computing system 103.

The processing unit 121 also includes interface logic 127 that is configured to provide graphical user interfaces (e.g., via generated HTML code) to a display (e.g., a touchscreen or other display screen of one of the user computing devices 110*a-b*). For example, the interface logic 127 includes instructions that when executed by a processor, in response to receiving a request (e.g., from a user computing device 110*a* navigating to a particular uniform resource locator), display a portal on the user computing device 110*a*. Further, the portal may first include an authentication page that prompts a client or agent associated with the user computing device 110*a* to enter one or more corresponding authentication credentials. The interface logic 127 may then cause the processing unit 121 to verify the client or agent based on the provided authentication credentials (e.g., via cross-referencing the credentials within a database of stored authentication credential and/or verifying the location of the user computing device 110 is within an expected area). In response to the verification of the authentication credentials, the interface logic 127 may generate a graphical user interface that includes information associated with the portal requested from the user computing device 110. For example, the graphical user interface includes an auto-test interface 150 that is configured to allow the client or agent to access, modify, update, delete, add, or read information in the auto-test database. Examples of such auto-test interfaces 150 are discussed below in reference to FIGS. 3 and 4. In some embodiments, the interface logic 127 also includes instructions that allow for an application-programming interface (API) session to be established with the third-party computing system 103 such that the auto-test interface 150 allows a user to update, modify, delete, read, or add scenarios to the auto-test database stored by the third-party computing system 103. In some embodiments, the interface logic 127 is performed by the processing unit 121, the third party computing system 103, or a combination thereof. In some embodiments, the interface logic 127 includes web artificial intelligence tools 151. The web artificial intelligence tools 151 may include virtual assistants or other tools providing prompts to assist the client or agent in navigating the interfaces presented.

The enterprise computing system 102 may also include a data output unit 124. The data output unit 124 is configured to output delimited files 160. For example, the auto-test interface 150 includes an output or export feature (e.g., in the form of a selectable button) that exports (e.g., retrieves all of the scenarios and associated data fields within the database) the data within the auto-test database via a delimited file 160. The delimited file 160 then may be stored in the memory 120 and/or output to other computing devices or applications (e.g., an excel file). The delimited file 160 may be used as a backup file for the auto-test database, a historical reference point, or presented via a graphical user interface for an agent or administrator to view in order to make assessments of the database.

The third party computing system 103 is a computing system not owned by the enterprise. In some embodiments, the decision logic 129 and/or the data acquisition logic described in reference to the enterprise computing system 102 are implemented partially or completely on the third party computing system 103. For example, the third party computing system 103 may be a cloud-based storage system or other server system owned and operated by a third-party separate from the enterprise. The third party computing system 103, similar to the enterprise computing system 102, includes a processing unit 132 having a processor, memory, and network interface. The third party computing system 103 also includes a decision engine 133, interface logic 134, and auxiliary logic 135. As indicated above, the interface logic 134 is configured to assist or perform operations to enable the functions, operations, and implementation of the auto-test interface 150. Further, the interface logic 134 may be configured to interface with the enterprise computing system 102 in order to receive requests or test requests and return an output or simulated output, respectively via an API. In various embodiments, a decision engine (such as decision engine 133) may, additionally or alternatively, be partially or wholly implemented by the enterprise computing system 102.

The third-party computing system 103 may also store one or more databases received via the enterprise computing system 102. For example, the third-party computing system 103 stores the auto-test database 130 and/or a general database 131. As discussed above, the auto-test database 130 is a repository of numerous potential scenarios that corresponds a particular set of input values to output values that correspond to potential output decisions that would be made from the decision logic 129 in various different scenarios. The general database is a repository that stores information such as when the auto-test database was updated, which user of the enterprise computing system updated or modified that database with time stamps, a historical record of requests made to the third-party system, and/or authentication credentials associated with each agent along with their associated permissions (e.g., read or read/write) to access the auto-test database.

The auxiliary logic 135 is configured to interact with the auto-test database 130. For example, the auxiliary logic 135 is configured to, in response to determining that a request from the enterprise computing system 102 is a test request (e.g., a request for an auto-test decision), access the auto-test database 130, cross-reference information from the test request (e.g., a unique key) within the auto-test database 130 to determine a simulated or test decision (e.g., outputs associated with the unique key), and transmit the test decision back to the enterprise computing system 102. The auxiliary logic 135 may also be configured to update the auto-test database 130 in response to receiving one or more user inputs via the auto-test interface 150 to add, change, or modify the information in the auto-test database 130. For example, the auxiliary logic 135 may be configured to read and write to the auto-test database 130 based on, for example, entries received through the auto-test interface.

In an example, the third party computing system 103 receives a request via an API call and return an auto-decision based on the inputs (or indication to return a decision based on a unique key) included within the request. The third party computing system 103 also is able to establish an API session with the enterprise computing system 102 in order for the enterprise computing system 102 to read, write, modify, update, delete, or read the files within the auto-test database. In this way, the enterprise computing system 102 is able to port into the remote database (e.g., auto-test database 130) in order to control or modify the data therein. Thus, the processing and storage requirements of the enterprise computing system 102 may be reduced without sacrificing access to and control over the auto-test database 130. Moreover, this allows for the enterprise computing system 102 to be updated, tested, and implemented with new data or an evolving decision engine 133 (e.g., an update to the decision engine 133 that may output new output values or output variables) without having to make simulated requests that require the decision engine 133 to run through processing intense processes.

The decision engine 133 may be a logical decision engine that receives as inputs one or more inputs (e.g., the data fields acquired by the data acquisition engine) and outputs a decision with an auto-generated explanation for the decision. In an example, the decision engine 133 is based on a decision tree that the decision logic follows from an initial input (e.g., a credit score) to other inputs (e.g., a number of credit inquiries, a fraud charge, or a bankruptcy decision) until a decision has been reached regarding whether the client qualifies for a product or service offered by the enterprise computing system. Continuing with the example, the decision engine 133 steps through each block on the decision tree and automatically determines that the client does qualify for the product or service and outputs a binary decision "yes" and an explanation and/or response (e.g., "congratulations!"). In another example, the decision engine 133 steps through each block on the decision tree and come to a decision block that causes the decision engine 133 to output a binary decision of "no" with an explanation and/or response (e.g., that the customer does not qualify at this time due to having a low credit score and too many inquiries in the past 12 months). The explanation may also prompt the user to contact an agent of the enterprise for further information regarding the decision or for a reconsideration based on extenuating circumstances. The auto-test database 130 is configured to or updated to (e.g., via the auto-test interface 150) to return the same fields or variables (e.g., although not the same values therein) as the fields or variables of the output from the decision engine.

The external data sources 112 may include a credit bureau, computing systems of other enterprises, or computing systems of government entities. For example, the external data sources 112 may include Equifax®, TransUnion®, and/or Experian®. The processing unit 121 may be able to generate and transmit a call (e.g., an API call) to one or more of the external data sources that includes information regarding a client (e.g., name, address, birthdate, etc.) and requests particular information back (e.g., credit score, inquiries, credit usage, negative reports, etc.). The processing unit 121 may then use the information returned from the external data sources 112 in the operations described herein.

Figure 2:
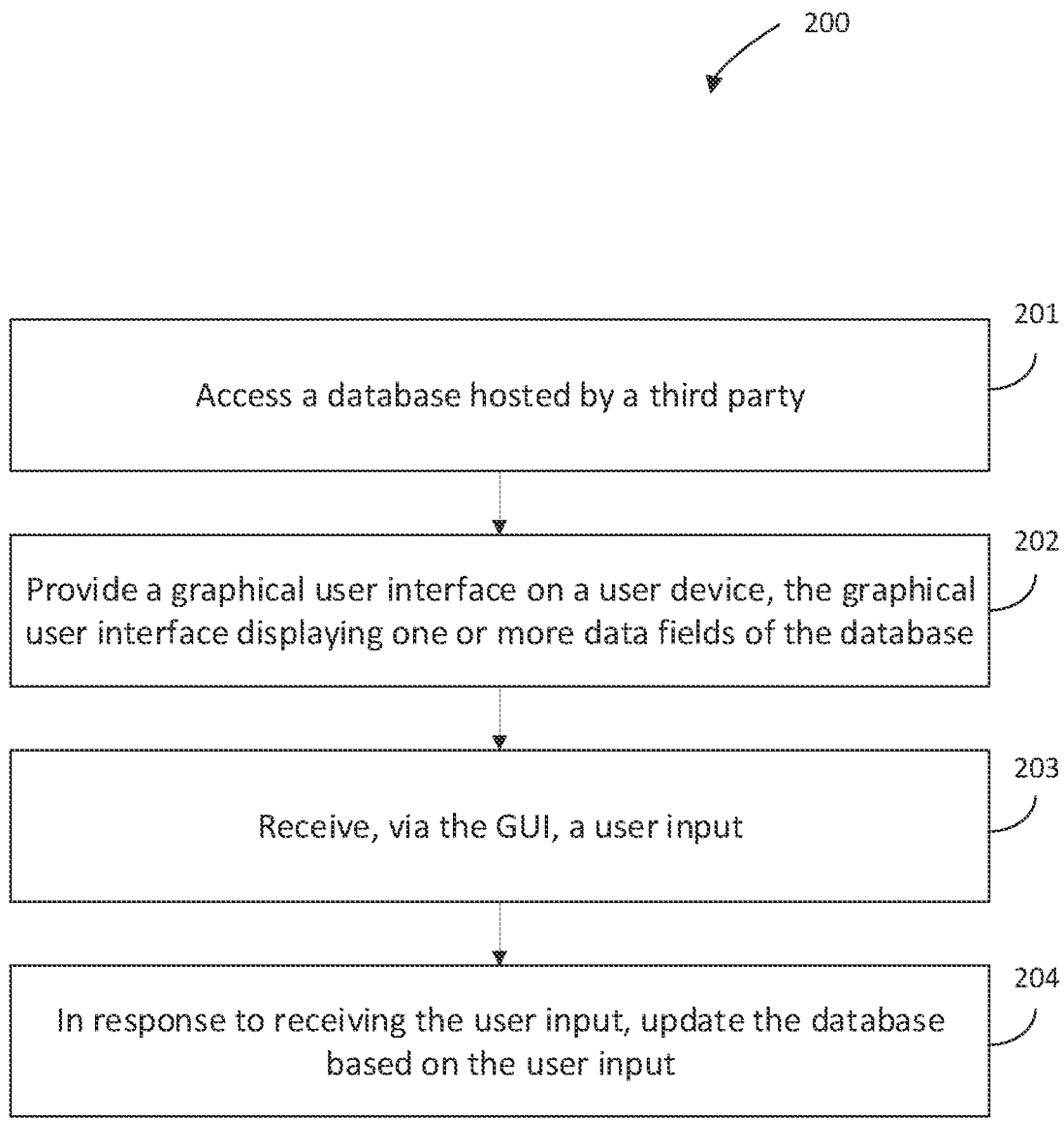
FIG. 2 depicts a flow diagram of a method of providing an auto-test interface via a graphical user interface in accordance with various potential embodiments.

Referring now to FIG. 2, a flow diagram of a method 200 of operation of an enterprise computing system is depicted in accordance with illustrative embodiments. The method 200 may be implemented via the enterprise computing system 102 in order to provide a database interface that allows for agents of the enterprise computing system 102 to update, read, or modify a remote database. In an example, the remote database includes an auto-test database that is stored or housed by a third party computing system.

In an operation 201, the enterprise computing system 102 accesses a database hosted by a third party computing system. For example, the enterprise computing system 102 may generate an API call and transmit the API call to the third party computing system to request access to the database. The API call may include a structured message that includes authentication credentials received via a graphical user interface (GUI) presented by the enterprise computing system 102 in response to a user navigating within an application (e.g., an application provided by the enterprise computing system 102 or via a web-browser) on a user computing device 110a to a portal associated with the database interface. In some embodiments, the enterprise computing system 102 first authenticates the user using the received authentication credentials in order to verify the agent before generating the API call. In some embodiments, the enterprise computing system 102 forwards the authentication credentials to the third-party computing system 103 that then verifies the agent and restricts any actions taken in attempt to modify the database based on one or more permissions that are pre-defined within the third party computing system 103.

In an operation 202, the enterprise computing system 102 provides GUI to the user-computing device 110a. For example, in response to the API call and successful verification of the authentication credentials, the enterprise computing system 102 and the third party computing system 103 may have an established API session. The enterprise computing system 102 may then call information from the database at the third party computing system 103 and display, via the GUI on the user computing device 110a, the contents of the accessed database. Moreover, the GUI may include selectable icons or sections that allow for the agent to change or modify the database. In some embodiments, the GUI includes options to upload a new batch of scenarios, delete a batch of scenarios, change a particular data-field of one of the scenarios, and/or change one or more data-fields of multiple scenarios.

In an operation 203, the enterprise computing system 102 receives, via the GUI, a user input. The user input may include a request or command to upload or add new scenarios, export the data within the database, delete one or more scenarios or data fields within the database, or modify one or more scenarios or data fields within the database. The user input may include keystrokes, selections on the GUI, and/or other interactions via an input device of the user-computing device 110a. In some embodiments, the user input is received and forward to the third party computing system 103. Alternatively or additionally, the user input may be received and analyzed by the enterprise computing system 102. For example, the enterprise computing system 102 may, in response to receiving the user input, update the GUI to provide a prompt that is configured to verify whether the changes intended by the user input are correct. In another example, the enterprise computing system 102 verifies, based on pre-defined permissions stored within the enterprise computing system 102, that the agent is allowed to make the changes intended by the user input. If the enterprise computing system 102 determines that the agent does not have such permissions (e.g., such as to delete multiple scenarios, instances, or data fields), then the enterprise computing system 102 may update the GUI to display an error or warning message.

In an operation 204, the enterprise computing system 102 causes the database to be updated based on the user input. For example, the enterprise computing system 102 may generate and transmit a request to change, modify, update, delete, or add data fields, instances, or scenarios to the database. In another example, the enterprise computing system 102 forwards the user input to the third party computing system 103 that then implements the change to the database based on the particular user input. In some embodiments, the enterprise computing system 102 and/or the third party computing system 103 may store information regarding modifications made to the database such as the identification of the agent who accessed the database and/or timestamps on any of the changes made to the database. Further, the enterprise computing system 102 may update the GUI based on the new information within the database, such that the agent is provided with the most up-to-date (e.g., real time data) that is within the database.

The enterprise computing system 102 may subsequently generate a test request to the third party computing system 103 having a unique key identifying a particular scenario (e.g., an updated scenario). The third party computing system 103 bypasses the decision engine based on identifying that the request is a test request (e.g., determined based on the presence of the unique key in the request) and cross-references an output (e.g., simulated output) in the auto-test database 130. The enterprise computing system 102 then receives back the simulated output from the third party computing system 103 and performs downstream processes as if the simulated output was an output generated from the decision engine 133 (e.g., an actual output). In various embodiments, downstream processes include the generation of adverse action letters with a specific explanation for reasons for decline. In an example, the enterprise computing system 102 may generate and output a response based on the simulated output. In an embodiment, the response includes a letter output configured to send the customer an approval or decline letter electronically or via mail, creating a record of the application within the enterprise computing system 102, and/or a visual presentation of the approval or decline message to the applicant via a graphical user interface displayed after the customer has submitted the application via the graphical user interface. Since an agent of the enterprise knows, based on the unique key used, the simulated output returned to the enterprise computing system 102 the agent is able analyze the response to determine whether the response was as expected. For example, an unexpected response may be indicative that there is an error in the decision logic 129 and the associated downstream processes. In this case, for example, the agent may debug the enterprise computing system 102 and re-simulate the process.

Figure 3:
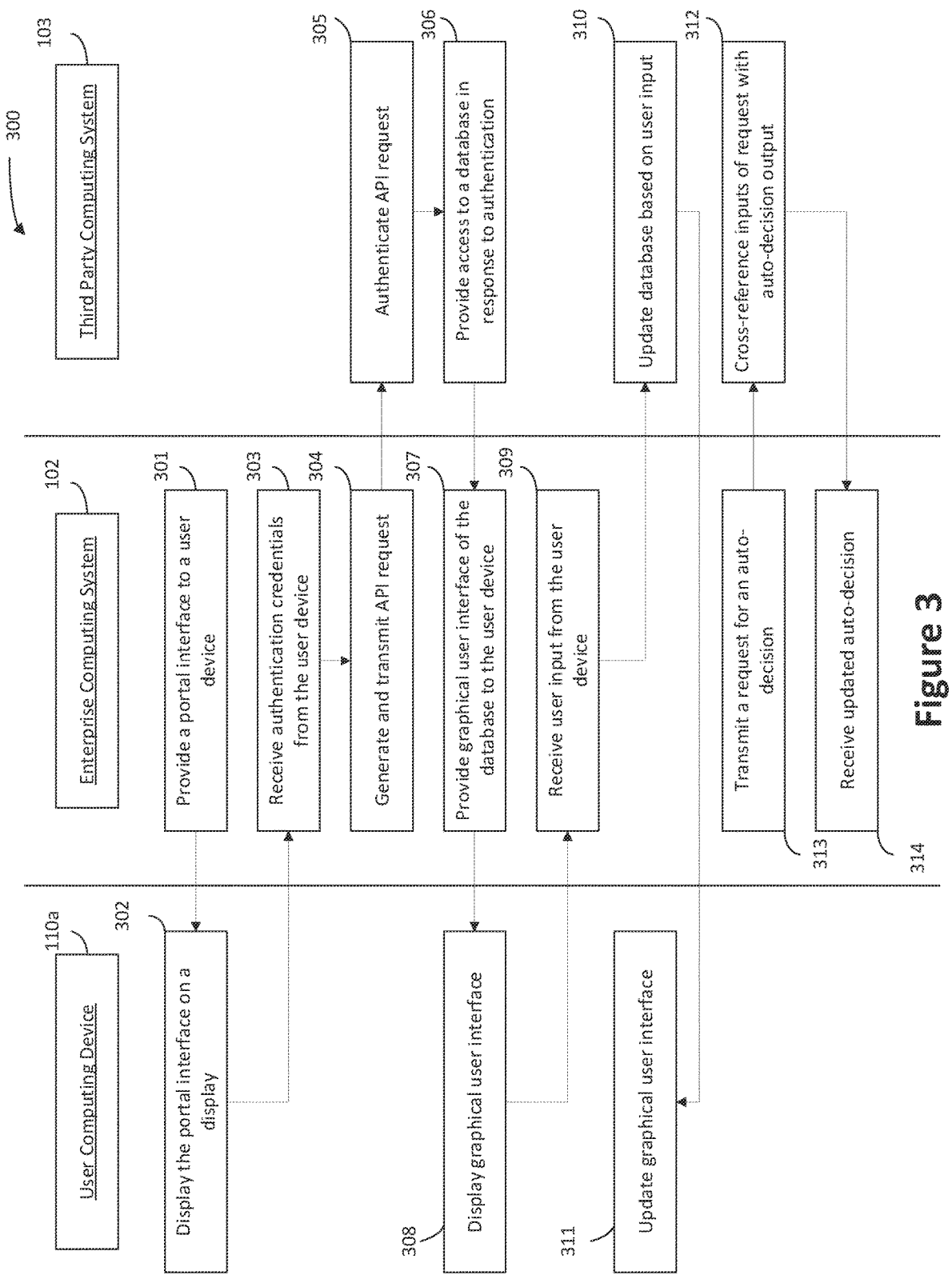
FIG. 3 depicts a flow diagram of a method for accessing and updating a test database via a graphical user interface to allow for testing of downstream processes in accordance with various potential embodiments.

Referring now to FIG. 3, a diagram of a method 300 of operation of interactions in a remote database system is depicted in accordance with illustrative embodiments. For example, method 300 demonstrates example interactions among a user computing device 110a, an enterprise computing system 102, and a third party computing system 103 storing a database that is associated with the enterprise computing system 102 that reduce friction in remotely storing data.

In an operation 301, the enterprise computing system 102 provides a portal interface to a user computing device 110a. For example, the user computing device 110a navigates to a particular URL associated with a portal for accessing a remote database (e.g., auto-test database 130 stored by a third party computing system) and, in response, the enterprise computing system 102 provides the portal interface via a GUI on the user computing device via sending instructions (e.g., HTML, instructions to the user computing device 110a). The portal interface may include a prompt for authentication credentials. In some embodiments, the authentication credentials include a username and a password. In some embodiments, portal interface is included within an account of the enterprise computing system 102 such that the agent must first sign into (e.g., authenticate themselves) to access their respective account before selectively navigating to the portal interface. In such embodiments, the enterprise computing system 102 has already authenticated the agent and may proceed to operation 305.

In an operation 302, the user-computing device 110a displays the portal interface via a display. The agent enters in authentication credentials via the portal interface that are then received by the enterprise computing system 102 at operation 303. In some embodiments, the enterprise computing system 102 verifies the authentication credentials via cross-referencing the received authentication credentials within a database and determine or identify permissions of an agent associated with the authentication credentials regarding the information that the agent may read or modify from the database. If the authentication credentials are not verified or the enterprise computing system 102 determines that the agent does not have permission to access the database, the enterprise computing system 102 may update the portal interface with a notification that access has been denied. Additionally or alternatively, the enterprise computing system 102 may generate and transmit a notification (e.g., SMS message, email, or push notification) to an administrative user of the enterprise computing system 102 to notify them that a particular agent is trying to access the database.

In an operation 304, the enterprise computing system 102 generates a request or call to establish an API session with the third party computing system 103 such that the enterprise computing system 102 is able to access the database. The API request or API call may include the authentication credentials along with a cryptographic key or token embedded within the request. The cryptographic key or token and/or the authentication credentials ensure that the third party computing system 102 does not establish an API session with a fraudulent computing system. The request or call may also include other information (e.g., other security certificates, internet protocol addresses) that may be used by the third party computing system 103 to verify that the request is indeed coming from the enterprise computing system 102.

In an operation 305, the third party computing system 103 has received the API request or API call and authenticates the request. For example, the third party computing system 103 may identify the location from which the request or call has come from and if the internet protocol (IP) address does not match with one of multiple pre-defined and stored set of IP addresses, the third party computing system 103 may reject the request. Moreover, the third party computing system 103 may verify the authentication credentials and identify the permissions associated with the authentication credentials to restrict any modifications to the database that are not allowed from that account. Additionally or alternatively, the third party computing system 103 may decrypt the cryptographic key or other security certificate sent with the request and verify (e.g., based on stored key information) that the request or call is from the enterprise computing system 102. Once authenticated, the third party computing system 103 may establish an API session with the enterprise computing session 102.

In an operation 306, the third party computing system 103 provides access to the database (e.g., auto-test database 130). For example, the third party computing system 103 may provide access to the database by allowing the enterprise computing system 102 to retrieve from and write to the database via the API session. The third party computing system 103 may transmit the data from the database including information regarding the size of the database, scenarios within the database, and the data fields within the scenarios. In this example, the third party computing system 103 provides access to the database based on the permissions associated with the authentication credentials. For example, in response to a first authentication credential, the third party computing system 103 may only allow a first user, via the graphical user interface on the user computing device 110a, to read the scenarios and data fields within the database. In another example, in response to a second authentication credential, the third party computing system 103 may allow a second user, via the graphical user interface on the user computing device 110a to read, write, and/or delete the scenarios and/or data fields.

In an operation 307, the enterprise computing system 102 provides a graphical user interface (GUI) of the database to the user-computing device 110a. The user computing device 110a may display the GUI in operation 308. In some embodiment, the GUI includes a depiction of all of the information within the database. For example, the GUI may include a list of scenarios or instances, the input data fields associated with each scenario, the output data fields associated with each scenario or instance, and/or meta-data associated with the database. In an example embodiment, the GUI is interactive such that an agent may scroll through and/or click on particular elements that cause the GUI to display either more detailed or less detailed information. The GUI may also allow (e.g., if the agent has the correct permissions) for the agent to update a value of one or more data fields in one or more scenarios, delete one or more scenarios, upload a new file (e.g., a new file including new scenarios) to add to the database, or modify other parts of the database. That is, the GUI allows for the agent to interactively, via the user computing device 110a, enter in one or more user inputs that are configured to cause modifications to the database. Additionally or alternatively, the third party computing system 103 may provide the graphical user interface directly to the user computing device 110a via the network.

In an operation 309, the enterprise computing system 102 receives a user input entered by an agent via the GUI. The enterprise computing system 102 analyzes the user input and, based on the pre-defined permissions, either updates the GUI with a message that the agent does not have permission to perform such actions or transmits a request and/or the user input to the third party computing system 103. The third party computing system 103 receives the request and/or the user input at operation 310 and implements a modification to the database based on the user input. In some embodiments, the third party computing system 103 may receive the user input directly from the user computing device 110a via the graphical user interface and update the database based on the user input and/or permissions associated with the authentication credential that initiated the API session. For example, due to a new policy that new credit cards cannot be issued to people with more than 15 credit inquiries in the past 12 months, an agent may wish to update the auto-decision database such that all scenarios with credit inquiries above 15 return a "no" decision with an explanation that the applicant was or would be denied based on the number of credit inquiries in the past 12 months. Accordingly, instead of having to regenerate or create an entire new database and send that new database to administrators of the third party computing system 102 to update, the agent is able to simply use the features of the GUI to search for all scenarios having more than 15 credit inquiries and update the corresponding outputs by interacting with the GUI.

Once the modification has been made the, the third party computing system 103 may transmit all of the new information in the database back to the enterprise computing system 102 and/or the user computing device 110a such that the GUI is updated with the new information in the database at operation 311. Additionally or alternatively, the third party computing system 103 may store information regarding the user input such as the agents name or identification number, the time at which the modification was made, and/or any other information regarding the change. It is to be appreciated that in some embodiments, the third party computing system 103 may be configured to provide the GUI to update the database directly to a user device in similar ways described in reference to the enterprise computing system 102. In this way, a user of the user computing device 110a can identify which output is going to be returned for each unique key (e.g., scenario associated with the unique key) in order to determine what outputs will be returned when a test request made when testing the downstream processes of the enterprise computing system 102.

In an operation 313, the enterprise computing system 102 receives a request for an auto-decision (e.g., via a second graphical user interface of the user computing device 110a) and generates and transmits a request for an auto-decision (e.g., a test request) to the third party computing system 103. The second graphical user interface may be generated by the enterprise computing system 102 in a test environment such that a user can simulate a particular scenario and analyze the corresponding response of the enterprise computing system 102. The test request may be similar to an actual request. For example, an actual request may include various input fields associated with the applicant such as their credit score, age, credit usage, etc. The actual request is designed to be input into the decision engine 133 and return an output having one or more output variables. The test request includes an indication to the third party computing system 103 to bypass the decision engine 133 and return a simulated output having one or more output variables from the database. In some embodiments, the indication to bypass the decision engine 133 (e.g., the indication that the request is a test request and not an actual request) is made by populating a test key variable in an input variable of the request. For example, the user, via the second graphical user interface, may enter a particular key value, the enterprise computing system 102 may generate a request having the particular key value (e.g., unique key) within the test key variable. The third party computing system 103 identifies that there is a value in the test key variable and determines to bypass the decision engine 133.

In an operation 312, the third party computing system 103, in response to receiving the request and identifying the request as a test request, cross-references the inputs in the request with the multiple scenarios in the auto-decision database and identifies a matching scenario. For example, the third party computing system 103 cross-references the particular key value in the test key variable with an associated scenario and determines the output variables associated with that scenario. The third party computing system 103 then accesses and transmits back to the enterprise computing system 102 the corresponding output fields that indicate a decision (e.g., an auto-decision) based on the inputs (e.g., based on the particular key value) sent in the request.

In an operation 314, the enterprise computing system 102 receives the output fields of the auto-decision (e.g., which may include a scenario that was recently updated or modified) and performs downstream operations as if the auto-decision was an actual decision. In some embodiments, the enterprise computing system 102 performs operations including generating a response to be displayed to an end user via a display, providing a product or service provided via the enterprise computing system 102 based on the decision, or performing additional tests to determine whether the scenario is correct. For example, the response may include displaying, via a graphical user interface, results of the decision and/or an explanation for the decision. The response may also include a prompt for additional information or instructions outlining how the client is to proceed. In some embodiments, the response is then be analyzed by an agent of the enterprise to determine whether the downstream processes are working correctly and take appropriate action based thereon.

Figure 4:
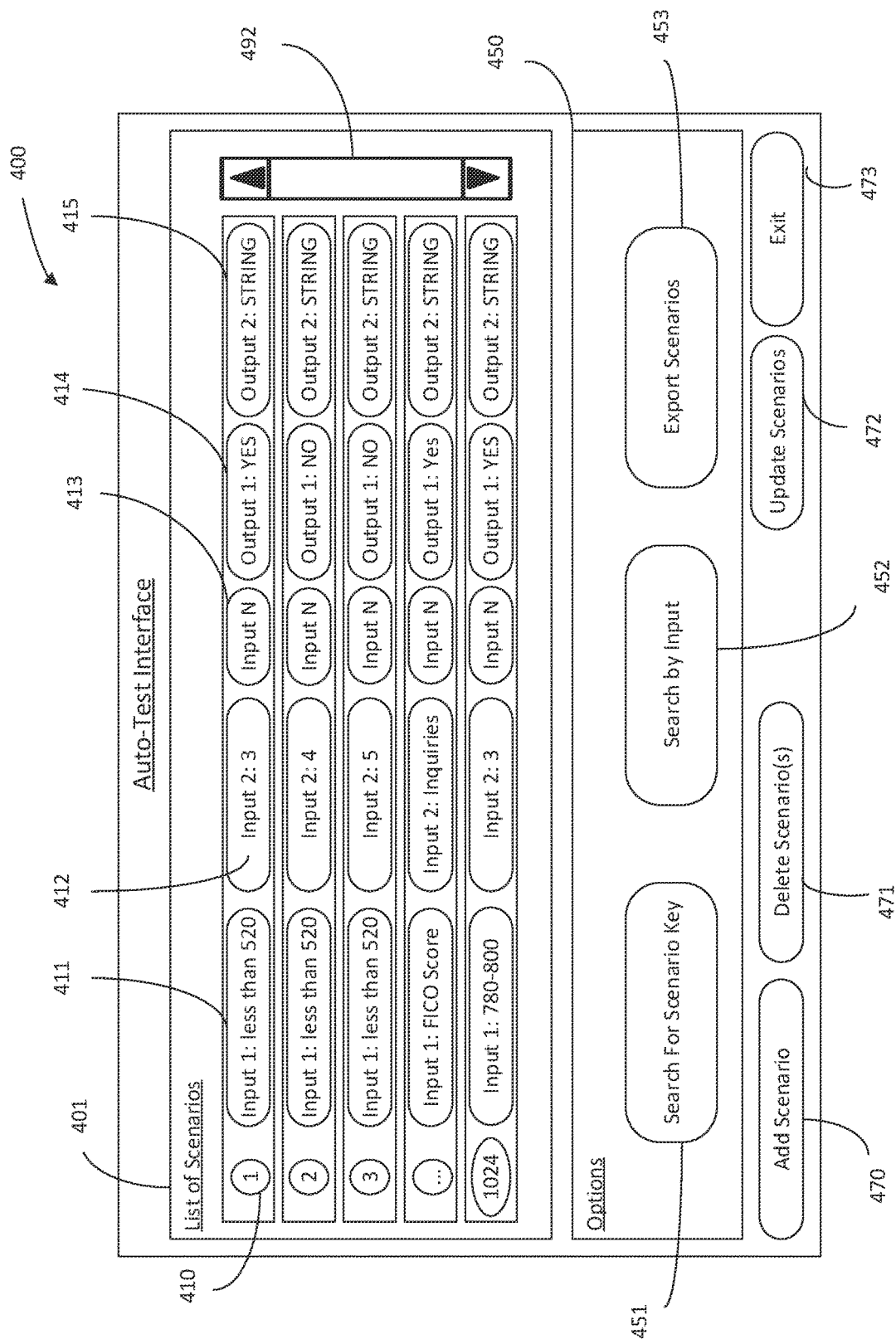
FIG. 4 is an example of an auto-test interface for viewing and updating a test database with new records in accordance with various potential embodiments.

Referring now to FIG. 4, an example of an auto-test interface 400 is depicted in accordance with various illustrative embodiments. The auto-test interface 400 is a graphical user interface (GUI) that is configured to depict information stored in an auto-test database 130 that is stored by a third party in a respective computing system.

The auto-test interface 400 includes a list of scenarios 401. For example, each scenario may be an instance of a scenario that includes multiple inputs and corresponding outputs. Each scenario may include a key 410 (e.g., a unique identifier that identifies the particular scenario), a set of input data-fields, and one or more output data-fields. For example, the set of inputs may include a first input 411 that corresponds to a credit score of the scenario, a second input 412 that corresponds to a number of credit inquiries in the past 12 months, and an N input 413 that corresponds to another input data field that is relevant to the auto-decision. The one or more output data-fields may include a first output data-field 414 that corresponds to a credit decision for the scenario (e.g., a binary "yes" or "no") and/or a second output data-field 415 that corresponds to an explanation for the decision in the scenario stored as a string data type. In some embodiments, the scenarios may include any number of output variables each having a particular data type and value associated therewith. In some embodiments, the number of output variables, data types, and values may be dependent upon the application in which the decision engine 133 is being deployed. The number of output variables and data type for each may be the same as output variables and associated data types that the decision engine 133 is configured to output. For example, this allows for the auto-test database 130 to effectively simulate the decision engine 133. In some embodiments, the scenarios are dependent on the number of potential outputs variables and output variable combinations. For example, in some embodiments, the scenarios may not have input variables, rather the input variables may be a description for scenarios of the associated outputs. The unique key 410 may identify the scenario regardless of the inputs of the scenario. For example, if the enterprise computing system 102 sends a request from the third party computing system to return one or more outputs corresponding to scenario "1" the third party computing system 103 will automatically look up scenario "1" (e.g., the first on the list in this example) and return the corresponding outputs 413 and 414.

In some embodiments, the unique key 410, first input 411, second input 412, N input 413, first output 414, and second output 415 are all selectable such that, when selected, allow for an agent with the necessary permissions to edit the value of the corresponding data field as a user input. The auto-test interface 400 also includes an options section 450. The options section 450 may include various selectable icons that, when selected, cause the enterprise computing system 102 and the third party computing system 103 to perform various operations. For example, the options section 450 may include a search for scenario key icon 451 that allows a user to input a particular scenario key and cause the GUI to update and display the corresponding scenario. The options section 450 may also include a search by input icon 452 that, when selected, redirects the GUI to ask the user which input (e.g., input 2) and corresponding value (e.g., 4) for the input that the agent would like to narrow the list of scenarios 401 to. The options section 450 may also include an export scenarios icon 453 that when selected causes the enterprise computing system 102 to request or automatically pull all of the data from the list of scenarios into a file (e.g., a delimited file) that can be saved locally.

The auto-test interface also includes an add scenario icon 470, a delete scenario icon 471, an update scenarios icon 472, and an exit icon 473. The add scenario icon 470, when selected, may cause the GUI to prompt the agent to either upload a new scenario manually or to upload a file having multiple scenarios therein that can be ported into the database on the third party computing system 103. Similarly, the delete scenario icon 471 may, when selected, cause the GUI to prompt the agent to enter in which scenarios (e.g., either singular or multiple) to delete in the database on the third party computing system 103. The update scenarios icon 472, when selected, may cause all of data-fields changed via a selection from the agent on the GUI to be transmitted to the enterprise computing system 102 and/or the third party computing system 103 and thereby update the database. It is to be appreciated that the GUI may have alternative or additional icons or selectable options in various different embodiments. The auto-test interface 400 also includes a scroll bar 492 that allows for a client to scroll through the multiple scenarios in the list of scenarios 401.

In various embodiments, a selection in one GUI (such as any of the GUIs discussed or illustrated in this disclosure) may change or switch which GUI is presented, or the selection may modify what functionality or information is provided in a particular GUI. In certain embodiments, various interactive inputs such as selection of a selectable icon, "hovering" over the icon with a selector (e.g., a pointer controlled by a mouse or other input device), "pressing and holding" at certain points on a GUI being displayed on a touchscreen, various gestures, or other inputs may provide additional functionality or information. For example, touching or hovering over an icon may generate a graphic (e.g., a graph showing changes or trends over time or details on a particular scenario) that is displayed on the GUI (near the icon or elsewhere). Certain selections may generate an input field or provide further optional selections (e.g., in the form of overlaid icons, fields, or imagery). In some embodiments, elements may be dynamically generated in a cascading fashion, such that, for example, a first activation in a first set of selectable functions or options generates a second set of selectable functions or options, a second activation in the second set of functions or options generates a third set of functions or options, and so on.

Figure 5:
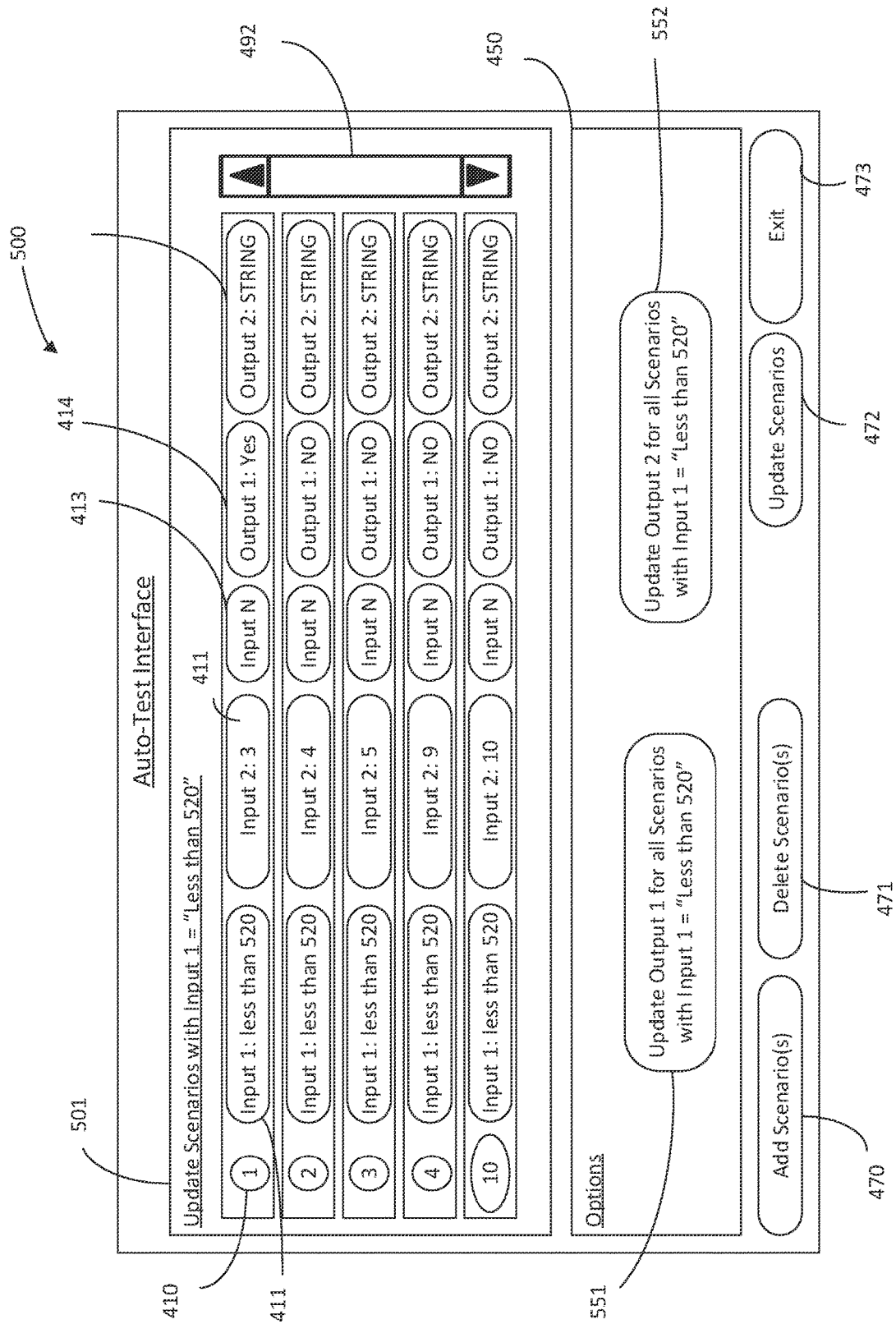
FIG. 5 is a second example of an auto-test interface for viewing and updating multiple records within a test database in accordance with various potential embodiments.

Referring now to FIG. 5, an example of an auto-test interface 500 is depicted in accordance with various illustrative embodiments. For example, the auto-test interface 500 is an example interface of auto-test interface 400 after the search by input icon 452 was selected and the GUI prompted the agent to enter in which input data-field (e.g., input 1) and corresponding value to display (credit score less than 520). Accordingly, the list of scenarios 501 is updated to only depict or show the scenarios that have a credit score of less than 520 in the input 1 variable.

The auto-test interface 500 includes the options section 450. The options section 450 includes an option 551 to update output 1 corresponding to all of the scenarios in the list of scenarios 501 (e.g., with a credit score) and a second option 552 to update output 2 corresponding to all of the scenarios in the list of scenarios 501. In this way, the agent is able to select, for example, the option 551, enter in a new value for output 1 as the user input, and cause the enterprise computing system 102 and/or the third party computing system 103 to update all of the values in the corresponding scenarios within the database.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

It should be understood that no claim element herein is to be construed under the provisions of 35 U.S.C. § 112(f), unless the element is expressly recited using the phrase "means for."

As used herein, the term "circuit," "logic," "engine," and/or "processing unit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit," "logic," "engine," and/or "processing unit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method implemented by an enterprise computing system that uses an auto-decision engine of a third-party computing system, the method comprising:
    requesting, by the enterprise computing system, from the third-party computing system comprising the auto-decision engine and an auto-test database, a simulated auto-decision based on a particular unique key, of a plurality of unique keys, corresponding to a particular scenario, of a plurality of scenarios, the request for the simulated auto-decision bypassing one or more functions of the auto-decision engine, the auto-test database comprising a plurality of scenarios, each scenario corresponding to a respective unique key of the plurality of unique keys and one or more corresponding output data fields;
    receiving, by the enterprise computing system, the simulated auto-decision corresponding to the particular unique key, the simulated auto-decision comprising one or more output data fields corresponding to the particular scenario;
    accessing, by the enterprise computing system, the auto-test database by executing an application programming interface (API) protocol of the third-party computing system;
    providing, by the enterprise computing system, a graphical user interface (GUI) displaying information regarding the auto-test database on a user computing device;
    receiving, by the enterprise computing system via the GUI, a user input that indicates a modification to a plurality of output data fields in the auto-database; and
    in response to receiving the user input, using the API protocol to update the plurality of output data fields in the auto-test database.

2. The method of claim 1, further comprising requesting, by the enterprise computing system, from the third-party computing system, a second simulated auto-decision based on the particular unique key, and receiving, by the enterprise computing system, the second simulated auto-decision corresponding to the particular unique key, the second simulated auto-decision comprising the plurality of output data fields.

3. The method of claim 1, further comprising providing a second GUI to display, on the user computing device, in response to receiving authentication credentials from the user computing device-, wherein the second GUI is configured to manage conditioned data within the auto-test database.

4. The method of claim 3, further comprising:
    receiving, via the second GUI by the enterprise computing system, a second user input;
    in response to receiving the second user input, causing, by the enterprise computing system, one or more data fields within the conditioned data to update.

5. The method of claim 4, wherein the second user input comprises a selection of a particular data field of the auto-test database and an indication of a new value for the particular data field, and wherein causing the one or more data fields within the conditioned data to update comprises causing the particular data field to update with the new value.

6. The method of claim 2, further comprising:
    receiving, via a second GUI by the enterprise computing system, a third user input;
    in response to receiving the third user input, causing, by the enterprise computing system, additional data to be added to the auto-test database.

7. The method of claim 6, wherein causing the additional data to be added to the auto-test database comprises transmitting, by the enterprise computing system via an application program interface (API), a second request to add data to the auto-test database and an indication of data fields to be added.

8. The method of claim 2, further comprising:
    receiving, via a second GUI by the enterprise computing system, a fourth user input;
    in response to receiving the fourth user input, causing, by the enterprise computing system, one or more data fields within the auto-test database to be deleted.

9. The method of claim 1, wherein accessing the auto-test database comprises transmitting a third request to the third-party computing system, wherein the third request includes multiple fields of data regarding a customer to the third-party computing system.

10. The method of claim 2, wherein the simulated auto-decision is formatted to include a reason for the auto-decision.

11. A non-transitory computer-readable medium comprising instructions that, when executed by a processor, cause the processor of an enterprise computing system to perform operations comprising:
    executing an application programming interface (API) protocol to access an auto-test database of a third-party computing system comprising an auto-decision engine, the auto-test database corresponding to the auto-decision engine and comprising one or more scenarios, each scenario corresponding to one or more input data fields and one or more output data fields in the auto-test database;
    providing a graphical user interface (GUI) on a display of a user computing device, the GUI configured to display information regarding the auto-test database;
    receiving a user input that indicates a modification to the one or more input data fields or the one or more output data fields;

in response to receiving the user input, causing one or more of the one or more input data fields or the one or more output data fields in the auto-test database to update using the API;

transmitting to the third-party computing system a request to bypass the auto-decision engine and return a simulated auto-decision based on the auto-test database, the request comprising a unique key corresponding to a scenario in the auto-test database; and receiving the simulated auto-decision corresponding to the unique key, the simulated auto-decision comprising output data fields corresponding to the scenario and updated in response to the user input.

12. The non-transitory computer-readable medium of claim 11, further comprising instructions causing the processor to transmit a second unique key to the third-party computing system to request a second simulated auto-decision based on the auto-test database, and receive the second simulated auto-decision.

13. The non-transitory computer-readable media of claim 12, wherein accessing the auto-test database comprises establishing an API session by the enterprise computing system with the third-party computing system.

14. The non-transitory computer-readable media of claim 13, wherein establishing the API session comprises transmitting, by enterprise computing system, authentication information to the third-party computing system.

15. The non-transitory computer-readable media of claim 12, wherein the GUI is configured to display the one or more scenarios of the auto-test database.

16. The non-transitory computer-readable media of claim 12, wherein the modification is addition of data to the auto-test database, and wherein causing the auto-test database to update comprises transmitting, by the enterprise computing system via the API, an API request to add the data to the auto-test database, the API request including the data to be added.

17. A computing system comprising:
a decision engine configured to receive data input fields and perform a set of functions to return decisions based on the data input fields;
an auto-test database (i) updatable via a third-party computing system through execution of an application programming interface (API), the auto-test database comprising a plurality of unique keys, each unique key corresponding to one or more output data fields; and
a processor and a memory comprising instructions that, when executed by the processor, cause the processor to:
receive, from the third-party computing system, a request to bypass one or more functions of the decision engine and return a simulated auto-decision response, the request comprising a unique key;
in response to receiving the request, accessing the auto-test database to identify a set of output data fields corresponding to the unique key;
in response to identifying the set of output data fields corresponding to the unique key, generating the simulated auto-decision response without performing one or more functions in the set of functions otherwise performed by the decision engine in returning decisions, the simulated response comprising the set of output data fields; and
transmitting the simulated response to the third-party computing system.

18. The computing system of claim 17, the processor further establishing an API session with the third-party computing system to allow one or more data fields in the auto-test database to be updated.

19. The computing system of claim 17, wherein the auto-test database comprises a plurality of scenarios, each scenario corresponding to a respective unique key and one or more corresponding output data fields.

20. The computing system of claim 17, further comprising a second auto-test database (i) updatable via a second third-party computing system through execution of a second API, the second auto-test database comprising a second plurality of unique keys, wherein the processor is further configured to accept requests for simulated auto-decisions from the second third-party computing system and return the simulated auto-decisions to the second third-party computing system based on the second plurality of unique keys.

* * * * *